(12) United States Patent
Gajjala et al.

(10) Patent No.: US 8,407,767 B2
(45) Date of Patent: Mar. 26, 2013

(54) PROVISIONING OF DIGITAL IDENTITY REPRESENTATIONS

(75) Inventors: Vijay K. Gajjala, Sammamish, WA (US); Colin H. Brace, Seattle, WA (US); Derek T. Del Conte, Sammamish, WA (US); Arun K. Nanda, Sammamish, WA (US); Stuart L. S. Kwan, Redmond, WA (US); Rashmi Raj, Eden Prairie, MN (US); Vijayavani Nori, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 673 days.

(21) Appl. No.: 11/856,636

(22) Filed: Sep. 17, 2007

(65) Prior Publication Data

US 2008/0178272 A1    Jul. 24, 2008

Related U.S. Application Data

(60) Provisional application No. 60/885,598, filed on Jan. 18, 2007.

(51) Int. Cl.
*H04L 29/06* (2006.01)
(52) U.S. Cl. .......... 726/5; 726/2; 726/6; 726/18; 726/26
(58) Field of Classification Search ........................ 726/6
See application file for complete search history.

(56) References Cited

U.S. PATENT DOCUMENTS

| | | | |
|---|---|---|---|
| 5,442,704 A | 8/1995 | Holtey | |
| 5,657,388 A | 8/1997 | Weiss | |
| 5,659,616 A | 8/1997 | Sudia | |
| 5,678,015 A | 10/1997 | Goh | |
| 5,887,131 A | 3/1999 | Angelo | |
| 5,907,838 A | 5/1999 | Miyasaka et al. | |
| 5,995,625 A | 11/1999 | Sudia et al. | |
| 6,005,939 A | 12/1999 | Fortenberry | |
| 6,016,476 A | 1/2000 | Maes et al. | |
| 6,161,125 A | 12/2000 | Traversat | |
| 6,202,151 B1 | 3/2001 | Musgrave et al. | |
| 6,442,532 B1 | 8/2002 | Kawan | |
| 6,526,434 B1 | 2/2003 | Carlson et al. | |
| 6,553,494 B1 | 4/2003 | Glass | |
| 6,754,829 B1 | 6/2004 | Butt et al. | 713/200 |
| 6,785,810 B1 | 8/2004 | Lirov | |
| 6,791,583 B2 * | 9/2004 | Tang et al. | 715/751 |
| 6,802,002 B1 | 10/2004 | Corella | |
| 6,810,480 B1 | 10/2004 | Parker | |
| 6,817,521 B1 | 11/2004 | Matada | |

(Continued)

FOREIGN PATENT DOCUMENTS

| | | |
|---|---|---|
| CN | 1456983 A | 11/2003 |
| CN | 1794284 A | 6/2006 |

(Continued)

OTHER PUBLICATIONS

International Search Report dated May 14, 2008 In Application Serial No. PCT/US2008/050205.

(Continued)

*Primary Examiner* — Kambiz Zand
*Assistant Examiner* — Imhotep Durham
(74) *Attorney, Agent, or Firm* — Merchant & Gould P.C.

(57) ABSTRACT

A system and method for provisioning digital identity representations ("DIRs") uses various techniques and structures to ease administration, increase accuracy, and decrease inconsistencies of a digital-identity provisioning system. Various methods are provided for creating new DIRs, requesting DIRs, notifying principals of available DIRs, and approving issuance of new DIRs.

19 Claims, 7 Drawing Sheets

U.S. PATENT DOCUMENTS

| | | |
|---|---|---|
| 6,836,765 B1 | 12/2004 | Sussman |
| 6,839,690 B1 | 1/2005 | Foth et al. |
| 6,856,963 B1 | 2/2005 | Hurwitz |
| 6,879,769 B1 | 4/2005 | Kawai |
| 6,934,841 B2 | 8/2005 | Boyles |
| 6,934,913 B2 | 8/2005 | Le |
| 6,955,295 B2 | 10/2005 | Hosogoe |
| 6,957,338 B1 | 10/2005 | Sumino |
| 6,961,857 B1 | 11/2005 | Floryanzia |
| 6,981,043 B2 | 12/2005 | Botz et al. ............... 709/225 |
| 6,993,659 B2 | 1/2006 | Milgramm |
| 7,000,108 B1 | 2/2006 | Yarsa et al. |
| 7,003,495 B1 | 2/2006 | Burger et al. |
| 7,007,298 B1 | 2/2006 | Shinzaki |
| 7,020,474 B2 | 3/2006 | Scott |
| 7,020,778 B1 | 3/2006 | Miettinen |
| 7,047,418 B1 | 5/2006 | Ferren |
| 7,069,447 B1 | 6/2006 | Corder |
| 7,083,095 B2 | 8/2006 | Hendrick |
| 7,103,773 B2 | 9/2006 | Erickson |
| 7,131,583 B2 | 11/2006 | Jaros et al. |
| 7,146,159 B1 | 12/2006 | Zhu |
| 7,162,475 B2 | 1/2007 | Ackerman |
| 7,162,581 B2 | 1/2007 | Newman et al. |
| 7,206,432 B2 | 4/2007 | Iwamura |
| 7,231,371 B1 | 6/2007 | Cantini et al. |
| 7,266,705 B2 | 9/2007 | Peck et al. |
| 7,356,837 B2 | 4/2008 | Asghari-Kamrani et al. |
| 7,409,543 B1 | 8/2008 | Bjorn |
| 7,424,457 B2 | 9/2008 | Khaishgi et al. |
| 7,451,921 B2 | 11/2008 | Dowling et al. |
| 7,475,429 B2 | 1/2009 | Carro |
| 7,680,819 B1 | 3/2010 | Mellmer |
| 7,788,499 B2 | 8/2010 | Cameron et al. |
| 2001/0034746 A1 | 10/2001 | Tsakiris |
| 2001/0054148 A1 | 12/2001 | Hoornaert |
| 2002/0010862 A1 | 1/2002 | Ebara |
| 2002/0026397 A1 | 2/2002 | Ieta et al. |
| 2002/0046041 A1 | 4/2002 | Lang |
| 2002/0103801 A1 | 8/2002 | Lyons |
| 2002/0124115 A1 | 9/2002 | McLean |
| 2002/0133535 A1 | 9/2002 | Lucovsky |
| 2002/0175916 A1 | 11/2002 | Nichols |
| 2002/0184508 A1 | 12/2002 | Bialick et al. |
| 2002/0194139 A1 | 12/2002 | Kianian |
| 2003/0005305 A1 | 1/2003 | Brickell |
| 2003/0018585 A1 | 1/2003 | Butler et al. |
| 2003/0046575 A1 | 3/2003 | Bhogal |
| 2003/0046591 A1 | 3/2003 | Asghari-Kamrani |
| 2003/0048904 A1 | 3/2003 | Wang et al. |
| 2003/0074660 A1 | 4/2003 | McCormack |
| 2003/0093681 A1 | 5/2003 | Wettstein |
| 2003/0135500 A1 | 7/2003 | Chevrel et al. |
| 2003/0149781 A1 | 8/2003 | Yared |
| 2003/0172090 A1* | 9/2003 | Asunmaa et al. ............ 707/200 |
| 2003/0177356 A1 | 9/2003 | Abela |
| 2003/0182421 A1 | 9/2003 | Faybishenko |
| 2003/0188019 A1 | 10/2003 | Wesley |
| 2003/0200175 A1 | 10/2003 | Wang |
| 2003/0200217 A1 | 10/2003 | Ackerman |
| 2003/0216136 A1 | 11/2003 | McBrearty et al. |
| 2003/0229783 A1* | 12/2003 | Hardt ........................ 713/155 |
| 2003/0233580 A1 | 12/2003 | Keeler et al. |
| 2004/0010720 A1 | 1/2004 | Singh |
| 2004/0054913 A1 | 3/2004 | West |
| 2004/0064708 A1 | 4/2004 | Angelo et al. |
| 2004/0103040 A1 | 5/2004 | Ronaghi |
| 2004/0103324 A1 | 5/2004 | Band |
| 2004/0111520 A1 | 6/2004 | Krantz |
| 2004/0114571 A1 | 6/2004 | Timmins |
| 2004/0122926 A1 | 6/2004 | Moore et al. |
| 2004/0162786 A1* | 8/2004 | Cross et al. .................. 705/59 |
| 2004/0205243 A1* | 10/2004 | Hurvig et al. ............. 709/245 |
| 2004/0230831 A1 | 11/2004 | Spelman |
| 2004/0250084 A1 | 12/2004 | Hamid |
| 2005/0044423 A1* | 2/2005 | Mellmer et al. ........... 713/201 |
| 2005/0050363 A1 | 3/2005 | Naka et al. |
| 2005/0059494 A1 | 3/2005 | Kammler |
| 2005/0065810 A1 | 3/2005 | Bouron |
| 2005/0074028 A1 | 4/2005 | Wugofski |
| 2005/0091264 A1 | 4/2005 | Cameron et al. |
| 2005/0091290 A1 | 4/2005 | Cameron et al. |
| 2005/0091492 A1 | 4/2005 | Benson |
| 2005/0091495 A1 | 4/2005 | Cameron et al. |
| 2005/0108575 A1 | 5/2005 | Yung |
| 2005/0114447 A1 | 5/2005 | Cameron et al. |
| 2005/0122926 A1 | 6/2005 | Cromer |
| 2005/0124320 A1 | 6/2005 | Ernst |
| 2005/0125677 A1 | 6/2005 | Michaelides |
| 2005/0125678 A1 | 6/2005 | Shaw |
| 2005/0149383 A1 | 7/2005 | Zacharia |
| 2005/0152544 A1 | 7/2005 | Kizawa |
| 2005/0172229 A1 | 8/2005 | Remo et al. |
| 2005/0182741 A1 | 8/2005 | Grossman |
| 2005/0183566 A1 | 8/2005 | Nash |
| 2005/0216405 A1 | 9/2005 | So |
| 2005/0278547 A1 | 12/2005 | Hyndman et al. |
| 2005/0283443 A1 | 12/2005 | Hardt |
| 2006/0005020 A1 | 1/2006 | Hardt |
| 2006/0005263 A1 | 1/2006 | Hardt |
| 2006/0010007 A1 | 1/2006 | Denman |
| 2006/0043164 A1 | 3/2006 | Dowling et al. |
| 2006/0080702 A1 | 4/2006 | Diez et al. |
| 2006/0104486 A1 | 5/2006 | Le Saint |
| 2006/0129509 A1 | 6/2006 | Gaines |
| 2006/0165060 A1 | 7/2006 | Dua |
| 2006/0174323 A1 | 8/2006 | Brown et al. |
| 2006/0174350 A1 | 8/2006 | Roever |
| 2006/0179481 A1 | 8/2006 | D'Agnolo |
| 2006/0200866 A1 | 9/2006 | Cameron |
| 2006/0206723 A1 | 9/2006 | Gil |
| 2006/0206724 A1 | 9/2006 | Schaufele |
| 2006/0224611 A1 | 10/2006 | Dunn |
| 2006/0248598 A1 | 11/2006 | Johnson et al. |
| 2006/0253582 A1 | 11/2006 | Dixon et al. |
| 2006/0282670 A1 | 12/2006 | Karchov |
| 2007/0011100 A1 | 1/2007 | Libin et al. |
| 2007/0124596 A1* | 5/2007 | Chevrel et al. ............. 713/182 |
| 2007/0143835 A1 | 6/2007 | Cameron |
| 2007/0194884 A1 | 8/2007 | Didier et al. |
| 2007/0203852 A1 | 8/2007 | Cameron |
| 2007/0204168 A1 | 8/2007 | Cameron |
| 2007/0204325 A1 | 8/2007 | Cameron |
| 2007/0300183 A1* | 12/2007 | Anttila et al. .............. 715/808 |
| 2008/0028215 A1 | 1/2008 | Nanda |
| 2008/0034412 A1* | 2/2008 | Wahl ............................ 726/8 |
| 2008/0103972 A1 | 5/2008 | Lanc |
| 2008/0178271 A1 | 7/2008 | Gajjala |
| 2008/0184339 A1 | 7/2008 | Shewchuk |
| 2008/0289020 A1 | 11/2008 | Cameron |
| 2010/0227680 A1 | 9/2010 | Leopold et al. |
| 2010/0287369 A1 | 11/2010 | Monden |

FOREIGN PATENT DOCUMENTS

| | | |
|---|---|---|
| EP | 0 767 418 A1 | 4/1997 |
| EP | 0913967 A2 | 5/1999 |
| EP | 0 944 218 A1 | 9/1999 |
| EP | 1 471 685 A2 | 10/2004 |
| EP | 1630734 | 3/2006 |
| EP | 1701505 | 9/2006 |
| EP | 1 729 480 A1 | 12/2006 |
| JP | 63-242751 A | 10/1988 |
| JP | 2001-344205 | 12/2001 |
| JP | 2005-38095 | 2/2005 |
| JP | 2005-518039 | 6/2005 |
| JP | 2006-524847 | 11/2006 |
| JP | 2010-517140 A | 5/2010 |
| JP | 2010-517176 A | 5/2010 |
| KR | 1020010110084 | 12/2001 |
| KR | 1020020096442 | 12/2002 |
| KR | 1020040048115 | 7/2004 |
| RU | 2004131027 | 4/2004 |
| RU | 2005120728 A | 7/2004 |
| RU | 2251748 C2 | 5/2005 |
| RU | 2292079 C2 | 1/2007 |
| WO | WO 96/08092 | 3/1996 |
| WO | WO 99/49614 | 9/1999 |

| | | |
|---|---|---|
| WO | WO 01/29641 A2 | 4/2001 |
| WO | WO 03/021837 | 3/2003 |
| WO | WO 03-053123 A2 | 7/2003 |
| WO | WO 2004/036348 A2 | 4/2004 |
| WO | WO 2004/044705 A2 | 5/2004 |
| WO | WO 2004/057796 A1 | 7/2004 |
| WO | WO 2006/122433 | 11/2006 |
| WO | WO 2007/097844 A1 | 8/2007 |
| WO | WO 2008/088944 A1 | 7/2008 |
| WO | WO 2008/088945 A1 | 7/2008 |
| WO | WO 2008/144204 A1 | 11/2008 |

OTHER PUBLICATIONS

International Search Report PCT/EP 00/10284 mailed Aug. 20, 2001, [3 pages].
International Search Report and Written Opinion cited in PCT/US2006/045386 mailed Apr. 20, 2007, [11 pages].
International Search Report and Written Opinion cited in PCT/US2007/001362 mailed Jun. 27, 2007, [8 pages].
Written Opinion of the International Searching Authority cited in PCT/US2007/013310 mailed Dec. 4, 2007, [6 pages].
International Search Report cited in PCT/US2008/050204 mailed Jun. 12, 2008, [9 pages].
International Search Report cited in PCT/US2008/051814 mailed Apr. 30, 2009, [3 pages].
European Search Report cited in EP 06 838 382 7 mailed Sep. 18, 2009, [11 pages].
Supplementary European Search Report and Opinion cited in Application No. PCT/US2007001362 mailed Oct. 7, 2009, [1 page].
European Examination Report cited in EP 06 838 382 7 mailed Nov. 19, 2009, [5 pages].
Chinese Office Action cited in Application No. 200880003205.8 mailed Jun. 12, 2010, [25 pages].
Chinese Office Action cited in Application No. 200780006584.1 mailed Aug. 4, 2010, [22 pages].
Chinese Office Action cited in Application No. 200880002607.6 mailed Sep. 14, 2010, [34 pages].
Chinese Office Action cited in Application No. 200680047525.4 mailed Nov. 10, 2010, [12 pages].
A Guide to Integrating with InfoCard v1.0, Microsoft Corporation, pp. 1-62 (Aug. 2005).
A Technical Reference for InfoCard v1.0 in Windows, Microsoft Corporation, pp. 1-36 (Aug. 2005).
About Authentication, http://www.Microsoft.com/windows2000/en/server/iis/default.asp?url=/windows2000/en/server/iis/htm/core/iiabasc.htm, pp. 1-5, last updated Feb. 28, 2000.
Access Control Smart Card: Two-Factor Authentication for the Enterprise Logical Access Control for the Enterprise, pp. 1-2, printed on Jul. 12, 2006 from http://www.cardwerk.com/smart-card-solutions/logical-access-control/.
Andy Harjanto's InfoCard WebLog, MSDN Blogs, http://blogs.msdn.com/andyhar/archive/2005/11/22/495649.aspx, 3 pages (Nov. 22, 2005).
Audio-Visual Multimodal Fusion for Biometric Person Authentication and Liveness Verification; http://deliverFy.acm.org/10.1145/1160000/1151808/p17-chetty.pdf?key1=1151808&key2=9045972611&coll=GUIDE&dl=GUIDE&CFID=75919783&CFTOKEN=92791909; 2006, [8 pages].
Benjamin, Henry; CCIE Self-Study: Security Protocols, Extensible Authentication Protocol, Protected EAP, and Temporal Key Integrity Protocol, http://www.ciscopress.com/articles/article.asp?p=422947&seqNum=7&rl=1, Oct. 28, 2005, pp. 1-4.
Cameron, K.; "The Laws of Identity," Architect of Identity, Microsoft Corporation, pp. 1-12 (May 12, 2005).
Chappell; Introducing InfoCard, Apr. 2006, pp. 1-16, http://msdn.microsoft.com/winfx/reference/infocard/default.aspx?pull=/library/en-us/dnlong/html/introinfocard.asp.
Chappell; "Introducing Windows CardSpace" [online], MSDN, [retrieved on Nov. 27, 2007], Apr. 2006, pp. 1-18, http://msdn2.microsoft.com/en-us/library/aa480189.aspx#introinfocard_topic2.
Chappell; "Introducing Windows CardSpace" Apr. 2006, 2010 Microsoft Corporation, http://msdn.microsoft.com/en-us/library/aa480189(printer).aspx), [13 pages].

Computational,. (2001), In Chambers 21st Century Dictionary, London: Chambers Harrap., Retrieved May 26, 2009 from <http://www.credoreference.com/entry/chambdict/computational>, [1 page].
Costa et al. "E-Services in Mission-Critical Organizations: Identification Enforcement," ICEIS 2004—Software Agents and Internet Computing, http://www-lih.univ-lehavre.fr/Intranet/proceedings/ICEIS2004/ICEIS%202004/Area%204%20-%20Software%20Agents%20and%20Internet%20Computing/Oral%20Presentations/Short%20Papers/C4_727_Costa.pdf.,[8 pages].
Daemen et al., "The Identity metasystem: Towards a Privacy-Compliant Solution to the Challenges of Digital Identity"; Oct. 2006; Microsoft Corporation White Paper, [21 pages].
Display. (2000), In Collins English Dictionary, London: Collins, Retrieved May 26, 2009 from <http://www.credoreference.com/entry/hcengdict/display>, [1 page].
Ernst, Johannes. "What is Microsoft InfoCard?" Johannes Ernst's Blog, May 18, 2005, http://netmesh.info/jernst/digital_identity/what-is-microsoft-infocard, [4 pages].
Evans et al.; "Private key infrastructure: balancing computer transmission privacy with changing technology and security demands," Computer Standards & Interfaces, vol. 27, pp. 423-437 (2005), [15 pages].
Fahrenholtz et al., "Transactional Security for a Distributed Reputation Manaement System", Lecture Notes in Computer Science, vol. 2455, 2002, [2 pages].
Force, G., Sr., Portable data encryption approaches, http://ieeexplore.ieee.org/xpl/freeabs_all.jsp?arnumber=485417, Nat. Semicond. Corp., (1995), [1 pages].
Hunt, R.; "Technological infrastructure for PKI and digital certification," Computer Communications, vol. 24, pp. 1460-1471 (2001).
Jones, "The Identity Metasystem: A User-Centric, Inclusive Web Authentication Solution", [online], Microsoft, 2005, pp. 1-27, http://www.w3.org/2005/Security/usability-ws/presentations/28-jones-id-metasystem.
Jøsang et al.; "What You See is Not Always What You Sign," Proceedings of AUUG2002, Melbourne, Australia, pp. 1-13 (Sep. 4-6, 2002).
Lancaster et al.; "Public key infrastructure: a micro and macro analysis," Computer Standards & Interfaces, vol. 25, pp. 437-446 (2003).
Lee et al., A Flexible Remote User Authentication Scheme Using Smart Cards, Chaoyang University of Technology, pp. 46-52; http://delivery.acm.org/10.1145/570000/567335/p46-lee.pdf?key1=567335&key2=8102952511&coll=GUIDE&dl=GUIDE&CFID=912131&CFTOKEN=21372357; Jul. 2002.
Liberty Alliance Project Whitepaper: Personal Identity, Mar. 23, 2006, [13 pages].
Lin et al., A flexible biometrics remote user authentication scheme, Tunghai University, (2004), 5 pages, http://islab.cis.thu.edu.tw/files/teacher/115.pdf.
Maximilien et al., "Conceptual Model of Web Service Reputation", © 2002, pp. 1-6.
Maximilien et al., "Reputation and Endorsement for Web Services", ACM Inc. printed Dec. 9, 2005, [8 pages].
Menezes et al., "Handbook of Applied Cryptography", CRC Press, 1996, Chapter 11 included; available at <http://www.cacr.math.uwaterloo.ca/hac>, [65 pages].
Nakamura et al. "Model-Driven Security Based on a Web Services Security Architecture," Proceedings of the 2005 IEEE International Conference on Services Computing (Scc'05), Jul. 15, 2005. [9 pages].
Party. (2004), In Roget's II The New Thesaurus, Boston, MA: Houghton Mifflin, <http://www.credoreference.com/entry/hmrogets/party>, [1 page].
Q&A: Microsoft's Kim Cameron Wins 'Balancing Innovation and Reality' Award for Contributions to Digital Identity, Microsoft PressPass, 3 pages (May 12, 2005) , [3 pages].
Resnick et al., ACM Portal, the ACM Digital Library, "Reputation Systems," vol. 43, No. 12, http://delivery.acm.org/10.1145/ 360000/355122/p45-resnick.html?key1+355122&key2=18... (2000), [1 page].

"Strong Authentication on Mobile Devices Leveraging the Oath Open Framework" [online], Diversinet, May 10, 2005, pp. 1-17, http://conference.digitalidworld.com/2005/attendees/slides/Sea_C_0510_1330a.pdf.

Techtree News Staff, "Infocard Spells End of Passwords." Techtree.com India, Feb. 16, 2006, [2 pages].

The fusion framework in a person identity verification system based on face and speech data http://ieeexplore.ieee.org/search/srchabstract.jsp?arnumber=1557132&isnumber=33117&punumber=10384&k2dockey=1557132@ieeecnfs&query=%28++identity+verification%3Cin%3Ede%29&pos=14; May 2005, [4 pages].

Token. (2000), In Collins English Dictonary, London: Collins, http://www.credoreference.com/entry/hcengdict/token, [1 page].

"Valimo Mobile Identity Platform for Financial Services", [online], HP, Dec. 2006, pp. 1-4, http://h71028.www7.hp.com/ERC /downloads/4AA0-9344ENW.pdf.

Von Welch et al. "Security for Grid Services," Proceedings of the 12th IEEE International Symposium on High Performance Distributed Computing (HPDC'03), Jun. 24, 2003. [10 pages].

You, Mobile Card Architecture for User Mobility and VHE in Heterogeneous Network Environments, http://www.cnsr.info/Download/PDF/poster1.pdf., University of New Brunswick (2003) [3 pages].

Wireless Application Forum, Ltd. "WAP Provisioning Smart Card," Jul. 10, 2001, http://simon.dehartog.nl/datasheets/protocols/WAP/WAP-186-PROVSC-20010710-a.pdf. [37 pages].

U.S. Office Action cited in U.S. Appl. No. 11/361,857 mailed Nov. 10, 2008, [22 pages].

U.S. Office Action cited in U.S. Appl. No. 11/312,920 mailed Apr. 15, 2009, [15 pages].

U.S. Office Action cited in U.S. Appl. No. 11/361,857 mailed May 29, 2009, [11 pages].

U.S. Office Action cited in U.S. Appl. No. 11/361,281 mailed Jun. 23, 2009, [19 pages].

U.S. Office Action cited in U.S. Appl. No. 11/495,826 mailed Jul. 15, 2009, [21 pages].

U.S. Office Action cited in U.S. Appl. No. 11/495,830 mailed Jul. 16, 2009, [14 pages].

U.S. Office Action cited in U.S. Appl. No. 11/312,920 mailed Sep. 8, 2009, [11 pages].

U.S. Office Action cited in U.S. Appl. No. 11/361,857 mailed Oct. 14, 2009, [12 pages].

U.S. Office Action cited in U.S. Appl. No. 11/312,920 mailed Dec. 31, 2009, [16 pages].

U.S. Office Action cited in U.S. Appl. No. 11/361,281 mailed Jan. 21, 2010, [14 pages].

U.S. Office Action cited in U.S. Appl. No. 11/495,830 mailed Mar. 3, 2010, [17 pages].

U.S. Office Action cited in U.S. Appl. No. 11/495,826 mailed Mar. 30, 2010, [18 pages].

U.S. Office Action cited in U.S. Appl. No. 11/361,857 mailed Mar. 31, 2010, [13 pages].

U.S. Office Action cited in U.S. Appl. No. 11/361,281 mailed Aug. 16, 2010, [16 pages].

U.S. Office Action cited in U.S. Appl. No. 11/495,830 mailed Aug. 30, 2010, [17 pages].

U.S. Office Action cited in U.S. Appl. No. 11/856,617 mailed Sep. 13, 2010, [24 pages].

U.S. Office Action cited in U.S. Appl. No. 11/952,890 mailed Oct. 7, 2010, [10 pages].

U.S. Office Action cited in U.S. Appl. No. 11/749,020 mailed Dec. 27, 2010, [17 pages].

Response to Communication from Chinese Intellectual Property Office re Application No. 200880003205.8, filed Dec. 12, 2010, 28 pp.

Chinese Office Action cited in Application No. 200880002693.0 dated Jan. 12, 2011, 22 pgs.

Response to Communication from Chinese Intellectual Property Office re Application No. 200880002607.6, filed Jan. 13, 2011, 21 pp.

Response to Communication from Chinese Intellectual Property Office re Application No. 200680047525.4, filed Mar. 7, 2011, 14 pp.

Chinese 2nd Office Action Application No. 200880002607.6 dated Mar. 22, 2011, 16 pgs.

Response to European Communication re EP Application No. 06838382.7, filed Mar. 29, 2010, 14 pp.

European Communication from Search Division cited in Application No. 08 713 521.6 mailed Apr. 11, 2011, 2 pgs.

European Communication from Search Division cited in Application No. 08 713 522.4 mailed Apr. 11, 2011, 2 pgs.

Response to Communication from Chinese Intellectual Property Office re Application No. 200880002693.0, filed May 12, 2011, 14 pp.

Response to European Communication re EP Application No. 07748971.4, filed May 25, 2010, 13 pp.

International Search Report PCT/US2008/062521 mailed Sep. 22, 2008, 10 pgs.

Notice of Allowance/Decision to Grant in Russian Application No. 2008124907 mailed Jan. 24, 2011, 5 pages, English translation.

Chinese 2nd Office Action mailed in Application No. 200680047525.4 mailed Apr. 20, 2011, 11 pgs.

European Communication re EP Application No. 07748971.4, mailed Jan. 20, 2010, 5 pp.

U.S. Office Action Response cited in U.S. Appl. No. 11/361,857 mailed Feb. 10, 2009, 15 pgs.

U.S. Office Action Response cited in U.S. Appl. No. 11/312,920 mailed Jul. 15, 2009, 13 pgs.

U.S. Office Action Response cited in U.S. Appl. No. 11/361,857 mailed Jul. 29, 2009, 6 pgs.

U.S. Office Action Response cited in U.S. Appl. No. 11/361,281 mailed Sep. 23, 2009, 14 pgs.

U.S. Office Action Response cited in U.S. Appl. No. 11/361,857 mailed Sep. 29, 2009, 10 pgs.

U.S. Office Action Response cited in U.S. Appl. No. 11/312,920 mailed Nov. 6, 2009, 11 pgs.

U.S. Office Action Response cited in U.S. Appl. No. 11/495,830 mailed Nov. 16, 2009, 15 pgs.

U.S. Office Action Response cited in U.S. Appl. No. 11/495,826 mailed Dec. 15, 2009, 12 pgs.

U.S. Office Action Response cited in U.S. Appl. No. 11/361,857 mailed Dec. 30, 2009, 9 pgs.

U.S. Office Action Response cited in U.S. Appl. No. 11/312,920 mailed Mar. 31, 2010, 12 pgs.

U.S. Office Action Response cited in U.S. Appl. No. 11/361,281 mailed Apr. 21, 2010, 12 pgs.

U.S. Office Action Response cited in U.S. Appl. No. 11/495,830 mailed May 3, 2010, 13 pgs.

Notice of Allowance cited in U.S. Appl. No. 11/312,920 mailed Jun. 22, 2010, 9 pgs.

U.S. Office Action Response cited in U.S. Appl. No. 11/361,857 mailed Jun. 30, 2010, 6 pgs.

U.S. Office Action Response cited in U.S. Appl. No. 11/495,826 mailed Aug. 30, 2010, 13 pgs.

Notice of Allowance cited in U.S. Appl. No. 11/495,826 mailed Oct. 15, 2010, 6 pgs.

U.S. Office Action Response cited in U.S. Appl. No. 11/361,281 mailed Nov. 16, 2010, 15 pgs.

U.S. Office Action Response cited in U.S. Appl. No. 11/495,830 mailed Nov. 30, 2010, 14 pgs.

Notice of Allowance cited in U.S. Appl. No. 11/361,281 mailed Dec. 8, 2010, 20 pgs.

U.S. Office Action Response cited in U.S. Appl. No. 11/856,617 mailed Dec. 13, 2010, 16 pgs.

Notice of Allowance cited in U.S. Appl. No. 11/495,826 mailed Mar. 17, 2011, 17 pgs.

U.S. Office Action Response cited in U.S. Appl. No. 11/749,020 mailed Mar. 28, 2011, 11 pgs.

Notice of Allowance cited in U.S. Appl. No. 11/856,617 mailed Mar. 29, 2011, 17 pgs.

U.S. Office Action cited in U.S. Appl. No. 11/952,890 mailed Apr. 8, 2011, 21 pgs.

Notice of Allowance cited in U.S. Appl. No. 11/495,830 mailed Apr. 19, 2011, 24 pgs.

Notice of Allowance cited in U.S. Appl. No. 11/361,281 mailed Apr. 28, 2011, 22 pgs.

Notice of Allowance cited in U.S. Appl. No. 11/361,281 mailed May 25, 2011, 8 pgs.
Notice of Allowance cited in U.S. Appl. No. 11/495,830 mailed May 26, 2011, 9 pgs.
U.S. Office Action cited in U.S. Appl. No. 11/749,020 mailed Jun. 10, 2011, 30 pgs.
U.S. Office Action Response mailed in U.S. Appl. No. 11/952,890 mailed Jan. 7, 2011, 15 pgs.
U.S. Office Action Response in U.S. Appl. No. 11/952,890 mailed Jul. 8, 2011, 12 pgs.
U.S. Office Action Response cited in U.S. Appl. No. 11/856,617 mailed May 23, 2011, 6 pgs.
Japanese Notice of Rejection in Application 2008-556319 mailed Sep. 22, 2011, 7 pgs.
Chinese 3rd Office Action in Application 2008800026930, mailed Dec. 13, 2011, 14 pgs.
Notice of Allowance cited in U.S. Appl. No. 11/495,830 mailed Oct. 5, 2011, 7 pgs.
US Office Action cited in U.S. Appl. No. 11/749,020 mailed Oct. 5, 2011, 18 pgs.
U.S. Appl. No. 11/361,857, Office Action mailed Dec. 2, 2011, 12 pgs.
U.S. Appl. No. 11/952,890, Office Action mailed Dec. 22, 2011, 13 pgs.
U.S. Appl. No. 11/749,020, Amendment and Response filed Jan. 5, 2012, 13 pgs.
Chinese 2nd Office Action cited in Application No. 200880003205.8 mailed Dec. 22, 2011, 8 pgs.
Chinese 2nd Office Action cited in Application CN 200880002693.0, mailed Sep. 7, 2011, 7 pgs.
Japanese Notice of Rejection in Application 2008545618 mailed Sep. 13, 2011, 4 pgs.
Chinese 2nd Office Action in Application 200880002693.0 mailed Sep. 7, 2011, 9 pgs.
Chinese 2nd Office Action in Application 200780006584.1 mailed Sep. 7, 2011, 9 pgs.
NOA cited in U.S. Appl. No. 11/856,617 mailed Aug. 31, 2011, 7 pgs.
"IIW2005: Mike Jones on Identity Metasystems," Windley's Technometria, Oct. 26, 2005, [online]. [retrieved on Jan. 31, 2012]. Retrieved from the Internet: (URL: http://www.windley.com/archives/2005/10/iiw2005_mike_jo.shtml), 3 pgs.
Japanese Notice of Rejection in Application 2008-545618, mailed Feb. 7, 2012, 4 pgs.
European Communication in Application 08828497.1, mailed Mar. 23, 2012, 2 pgs.
U.S. Appl. No. 11/361,857, Amendment and Response filed Apr. 1, 2012, 11 pgs.
U.S. Appl. No. 11/749,020, Office Action mailed Mar. 13, 2012, 12 pgs.
U.S. Appl. No. 11/952,890, Amendment and Response filed Feb. 29, 2012, 12 pgs.
Chinese 3rd Office Action cited in Application No. 200880003205.8 mailed Apr. 23, 2012, 6 pgs.
Chinese Decision on Rejection in Application 200880002693.0, mailed May 3, 2012, 12 pgs.
Chinese 2nd Office Action mailed in Application No. 200880015890.6 mailed Apr. 18, 2012, 7 pgs.
Chinese Final Rejection in Application 200780006584.1, mailed May 2, 2012, 9 pgs.
Chinese Notice of Allowance in Application 200680047525.4 mailed Feb. 23, 2012, 4 pgs.
Japanese Notice of Allowance in Application 2008-545618, mailed May 23, 2012, 6 pgs.
Japanese Notice of Final Rejection in Application 2008-556319, mailed Apr. 6, 2012, 4 pgs.
Russian Notice of Allowance in Application 2009127801, mailed Apr. 10, 2012, 7 pgs.
Russian Notice of Allowance in Application 2009141971, mailed May 15, 2012, 6 pgs.
U.S. Appl. No. 11/361,857, Office Action mailed Jun. 27, 2012, 11 pgs.
Chinese 3rd Office Action in Application 200880015890.6, Jul. 18, 2012, 7 pgs.
U.S. Appl. No. 11/749,020, Amendment and Response filed Jul. 11, 2012, 14 pgs.
Chinese Third Office Action Decision on Rejection mailed in Application No. 200880002607.6 mailed Jul. 26, 2011, 17 pgs.
Chinese Office Action mailed in Application No. 200880015890.6 mailed Jul. 20, 2011, 10 pgs.
European Communication and Supplemental Search Report in Application No. 08 713 522.4 mailed Jul. 25, 2011, 9 pgs.
European Communication and Supplemental Search Report re EP Application No. 08713521.6, mailed Jul. 20, 2011, 9 pgs.
Notice of Allowance cited in U.S. Appl. No. 11/495,826 mailed Aug. 4, 2011, 8 pgs.
Notice of Allowance cited in U.S. Appl. No. 11/361,281 mailed Aug. 18, 2011, 10 pgs.
Chinese 4th Office Action in Application 200880003205.8, mailed Aug. 24, 2012, 8 pgs.
European Oral Hearing Summons in EP Application No. 07748971.4, mailed Nov. 29, 2010, 6 pgs.
European Minutes of the Oral Proceedings in EP Application No. 07748971.4, mailed Apr. 8, 2011, 22 pgs.
U.S. Appl. No. 11/749,020, Notice of Allowance mailed Aug. 20, 2012, 5 pgs.
Extended European Search Report issued in Patent Application 08828497.1, dated Aug. 30, 2012, 8 pgs.
Recordon, David and Reed, Drummond, "OpenID 2.0: A Platform for User-Centric Identity Management," Conference on Computer and Communications Security Proceedings of the Second ACM Workshop on Digital Identity Management, ACM, XP007907214, New York, NY, Nov. 3, 2006, 6 pgs.
Jones, Michael B., "A Guide to Supporting Information Cards within Web Applications and Browsers as of the Information Card Profile V1.0," Internet Citation, Dec. 1, 2006, XP007918750, 13 pgs. URL: http://citeseerx.ist.psu.edu/viewdoc/download?doi=10.1.1.69.9021&rep1&type=pdf.
Goldack, Martin, "Lesson Learned: From MS Passport to Cardspace," Jul. 9, 2006, XP55033966, 13 pgs. URL: http://nds.hgl.rub.de/lehre/seminar/ISS06/Goldack_PassportCardSpace.pdf [retrieved on Jul. 26, 2012].
Russian Notice of Allowance in Application 2009127802, mailed Aug. 30, 2012, 6 pgs.
U.S. Appl. No. 11/749,020, Amendment and Response filed Oct. 2, 2012, 6 pgs.
European Office Action in Application 08713522.4, mailed Nov. 15, 2012, 7 pgs.
European Office Action in Application 08713521.6, mailed Oct. 26, 2012, 6 pgs.

* cited by examiner

PROVISIONING OF DIGITAL IDENTITY REPRESENTATIONS

RELATED APPLICATIONS

This application claims priority from U.S. Provisional Patent Application No. 60/885,598. This application is related to U.S. patent application Ser. No. 11/856,617 (now U.S. Pat. No. 8,087,072), entitled "Provisioning of Digital Identity Representations," and to U.S. patent application Ser. No. 11/361,281, each of which is assigned to the same assignee as the present application and incorporated by reference herein.

BACKGROUND

Tremendous innovation has occurred recently in developing systems to give individuals more control over how their personal identity information is distributed and used, particularly in a digital context. For example, Microsoft Corporation of Redmond, Wash., among others, has propagated a system sometimes referred to as the Information Card Selector—Microsoft's instantiation being referred to as Windows CardSpace. In a Windows CardSpace system, a principal obtains one or more digital identity representations, sometimes referred to as information cards. When the principal attempts to access a resource (a "relying party") that requires a set of claims made about the principal, the principal employs a digital identity representation (hereafter called a "DIR") to initiate communication with an identity provider that can assert those claims. In some cases, the identity provider may be controlled by a principal and run on the principal's own machine. In others it may be controlled by a third party. The identity provider returns an "identity token" that includes the required claims information.

Little attention has been directed, however, towards the creation and provisioning of DIRs. Currently, administrators of digital identity systems are forced to craft DIRs manually. For example, an administrator may manually use a software utility, such as an XML generator, to craft a DIR and save it to a particular location. The administrator might then send the principal a pointer to the DIR, and the principal would then go retrieve the DIR. This system is ad hoc, subject to errors and security vulnerabilities, and labor intensive for an administrator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect relates to a method for provisioning a DIR for a principal. A request is received through a first channel, such as an HTTP request, to create the DIR for the principal. A notification is then sent through a second channel, e.g., email, that the DIR has been requested. Approval for the DIR to be created is then received before the DIR is created.

Another aspect relates to still another method for provisioning a DIR for a principal. A notification that the DIR is available for the principal is issued. A request to create the DIR is then received before the DIR is created.

Another aspect relates to still another method for provisioning a DIR for a principal. A DIR generation system is polled (e.g., by an application running on the principal's machine) to determine whether any new DIRs are available to the principal. It is then determined whether a new DIR is available to the principal. If so, a request is sent for the new DIR to be created. Finally, the new DIR is received.

Another aspect relates to method for provisioning a DIR for a group of principals. A policy is set that the group of principals is permitted access to the DIR. The group of principals is then notified that the DIR is available. A request is then received from at least a first principal in the group of principals to create the DIR. Finally, the DIR is created for at least the first principal.

BRIEF DESCRIPTION OF THE DRAWINGS

Reference will now be made to the accompanying drawings, which are not necessarily drawn to scale, and wherein.

DETAILED DESCRIPTION

Example embodiments will now be described more fully hereinafter with reference to the accompanying drawings. Like numbers refer to like elements throughout.

Example embodiments disclosed herein relate generally to identity systems including DIRs used in initiating communication for production of identity tokens that can be exchanged between a principal, an identity provider, and a relying party to authenticate an identity and/or information related to the principal. In example embodiments herein, the principal may be a natural person or persons, a computer, a network, or any other entity. The relying party has goods, services, or other information that the principal desires to access and/or obtain. In example embodiments, the relying party can be any resource, privilege, or service that requires a security policy to enter, access, or use. For example, a relying party may comprise one or more of: computers, computer networks, data, databases, buildings, personnel, services, companies, organizations, physical locations, electronic devices, or any other type of resource.

Figure 1:
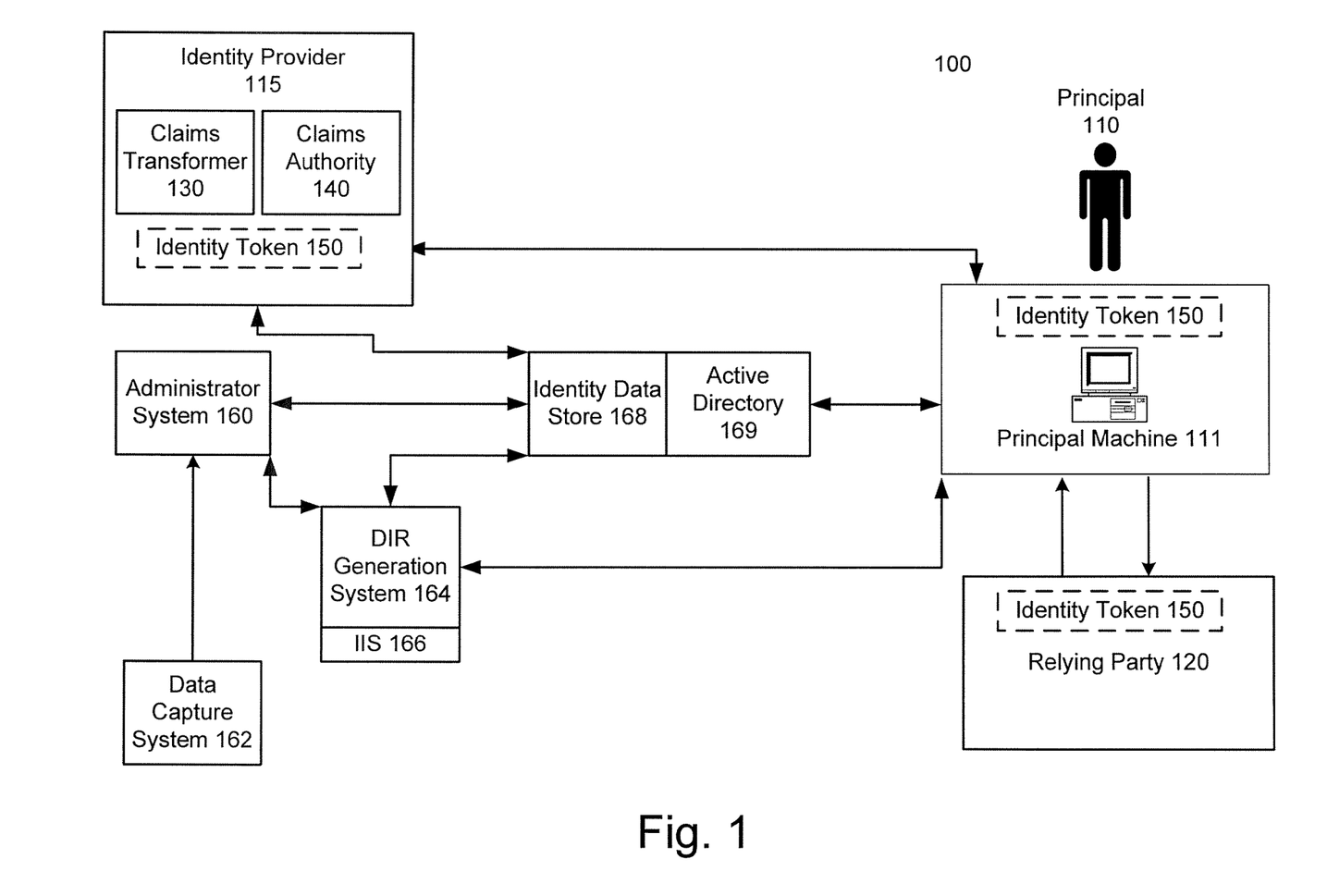
FIG. 1 illustrates an example DIR system including a principal, a principal machine, a relying party, an identity provider, a DIR generation system, an identity data store, an administrator system, and a data capture system.

Referring now to FIG. 1, an example DIR system 100 is shown including a principal 110 and a relying party 120. Principal 110 is in possession or control over principal machine 111. Principal machine 111 includes a computer system at least temporarily controlled by the principal 110. Relying party 120 may also include a computer system. System 100 may also include an administrator system 160, a data capture system 162, a DIR generation system 164, and identity data store 168, and an identity provider 115, each of which are discussed further below and may include, or be part of, a computer system.

Principal 110 and relying party 120 can communicate with each other over one or more networks, such as the Internet, or through telephonic or other forms of wired or wireless communication. In example embodiments, principal 110 can request goods, services, information, privileges, or other access from relying party 120. Relying party 120 can require authentication of the identity of, or information about, principal 110 before or in conjunction with providing the requested access to principal 110.

Also shown in FIG. 1 is an example identity provider 115. Identity provider 115 includes a computer system. In example embodiments, identity provider 115 includes a claims transformer 130 and a claims authority 140. The claims transformer 130 is sometimes referred to as a "security token service." In the example shown, identity provider 115 can provide one or more claims about principal 110. A claim is a statement or assertion made about the principal, possibly including information about the principal such as, for example, name, address, social security number, age, credit history, transactional requirements, etc. As described further below, identity provider 115 can provide claims to principal 110 and/or relying party 120 in the form of a digitally signed identity token. In example embodiments, identity provider 115 is in a trusted relationship with relying party 120, so that relying party 120 trusts the claims in the signed identity token from identity provider 115.

Although claims transformer 130 and claims authority 140 of identity provider 115 are shown as separate entities in FIG. 1, in alternative embodiments claims transformer 130 and claims authority 140 can be the same entity or different entities. Identity provider 115 may take the form of a security token service in some example embodiments. Similarly, identity provider 115 and DIR generation system 164 may be the same or different entities.

Computer systems described herein include, without limitation, a personal computer, server computer, hand-held or laptop device, microprocessor system, microprocessor-based system, programmable consumer electronics, network PCs, minicomputers, mainframe computer, smart card, telephone, mobile or cellular communication device, personal data assistant, distributed computing environment that includes any of the above systems or devices, and the like. Some computer systems described herein may comprise portable computing devices. A portable computing device is any computer system that is designed to be physically carried by a user. Each computer system may also include one or more peripherals, including without limitation: keyboard, mouse, a camera, a web camera, a video camera, a fingerprint scanner, an iris scanner, a display device such as a monitor, a microphone, or speakers.

Each computer system includes an operating system, such as (without limitation) the WINDOWS operating system from Microsoft Corporation, and one or more programs stored on the computer readable media. Each computer system may also include one or more input and output communications devices that allow the user to communicate with the computer system, as well as allow the computer system to communicate with other devices. Communications between the computer systems used by principal 110 (e.g., principal machine 111), relying party 120, DIR generation system 164, administrator system 160, data capture system 162, and identity provider 115 can be implemented using any type of communications link, including, without limitation, the Internet, wide area networks, intranets, Ethernets, direct-wired paths, satellites, infrared scans, cellular communications, or any other type of wired or wireless communications.

In some example embodiments disclosed herein, system 100 is implemented at least in part as an Information Card system provided in the .NET 3.0 framework developed by Microsoft Corporation of Redmond, Wash. The Information Card system allows principals to manage multiple DIRs from various identity providers.

The Information Card system utilizes a web services platform such as the Windows Communication Framework in the .NET 3.0 framework. In addition, the Information Card system is built using the Web Services Security Specifications propagated at least in part by Microsoft Corporation of Redmond, Wash. These specifications include a message security model WS-Security, an endpoint policy WS-SecurityPolicy, a metadata exchange WS-MetadataExchange, and a trust model WS-Trust. Generally, the WS-Security model describes how to attach identity tokens to messages. The WS-SecurityPolicy model describes end point policy requirements, such as required identity tokens and supported encryption algorithms. Such policy requirements can be conveyed and negotiated using a metadata protocol defined by WS-MetadataExchange. The WS-Trust model describes a framework for trust models that enables different web services to interoperate. Some example embodiments described herein refer to the Web Services Security Specifications described above. In alternative embodiments, one or more other specifications can be used to facilitate communications between the various subsystems in system 100.

Referring again to FIG. 1, principal 110 can send a request via principal machine 111 to relying party 120 for access to goods, services, or other information. For example, in one embodiment, principal machine 111 sends a request to relying party 120 for access to information from relying party 120 that principal 110 desires. The request sent by principal machine 111 can include a request for the authentication requirements of relying party 120 using, for example, the mechanisms provided in WS-MetadataExchange.

In response to the request, relying party 120 may send principal machine 111 requirements for relying party 120 to authenticate principal's identity or other information about principal 110. The requirements of relying party 120 for authentication are referred to herein as a security policy. A security policy minimally defines the set of claims from a trusted identity provider 115 that the principal 110 must provide to relying party 120 for relying party 120 to authenticate principal 110. A security policy can include a requirement of proof regarding a personal characteristic (such as age), identity, financial status, etc. It can also include rules regarding the level of verification and authentication required to authenticate any offers of proof (e.g., digital signature from a particular identity provider).

In one example, relying party 120 specifies its security policy using WS-SecurityPolicy, including both the claim requirements and type of identity token required by relying party 120. Examples of types of claims include, without limitation, the following: first name, last name, email address, street address, locality name or city, state or province, postal code, country, telephone number, social security number, date of birth, gender, personal identifier number, credit score, financial status, legal status, etc.

The security policy can also be used to specify the type of identity token required by relying party 120, or a default type can be used as determined by the identity provider. In addition to specifying the required claims and token type, the security policy can specify a particular identity provider required by the relying party. Alternatively, the policy can omit this element, leaving the determination of the appropriate identity provider up to principal 110. Other elements can be specified in the security policy as well such as, for example, the freshness of the required security token.

In some embodiments, principal 110 can require that relying party 120 identify itself to principal machine 111 so that principal 110 can decide whether or not to satisfy the security policy of relying party 120, as described below. In one example, relying party 120 identifies itself using an X509 certificate. In other embodiments, relying party 120 can identify itself using other mechanisms such as, for example, a Secure Sockets Layer ("SSL") server certificate.

Principal machine 111 may include one or more DIRs for principal 110. These DIRs (sometimes referred to as "Information Cards" in the Windows Cardspace system provided in the .NET 3.0 framework developed by Microsoft Corporation of Redmond, Wash.) are artifacts that represent the token issuance relationship between principal 110 and a particular identity provider, such as identity provider 115. Each DIR may correspond to a particular identity provider, and principal 110 can have multiple DIRs from the same or different identity providers. The use of DIRs in an identity system is described in detail in U.S. patent application Ser. No. 11/361,281, which is incorporated herein by reference as if fully set forth herein.

DIRs can include, among other information, the identity provider's issuance policy for identity tokens, including the type of tokens that can be issued, the claim types for which it has authority, and/or the credentials to use for authentication when requesting identity tokens. DIRs may be represented as XML documents that are issued by identity providers 115 or DIR generation systems 164 and stored by principals 110 on a storage device such as principal machine 111.

Principal machine 111 may also include an identity selector. Generally, an identity selector is a computer program and user interface that permits principal 110 to select between one or more DIRs of principal 110 on principal machine 111 to request and obtain identity tokens from one or more identity providers, such as identity provider 115. For example, when a security policy from relying party 120 is received by principal machine 111, the identity selector may be programmed to identify one or more DIRs that satisfy one or more of the claims required by the security policy using the information in DIRs. Once principal 110 receives the security policy from relying party 120, principal 110 can communicate with (using, for example, principal machine 111) one or more identity providers to gather the claims required by the policy.

In example embodiments, principal 110 requests one or more identity tokens from identity provider 115 using the issuance mechanism described in WS-Trust. In example embodiments, principal 110 forwards the claim requirements in the policy of relying party 120 to identity provider 115. The identity of relying party 120 can, but need not, be specified in the request sent by principal 110 to identity provider 115. The request can include other requirements as well, such as a request for a display token.

Generally, claims authority 140 of identity provider 115 can provide one or more of the claims required by the security policy from relying party 120. Claims transformer 130 of identity provider 115 is programmed to transform the claims and to generate one or more signed identity tokens 150 that include the claim(s) relating to principal 110.

As noted above, principal 110 can request an identity token in a certain format in its request to identity provider 115, based on requirements from relying party 120. Claims transformer 130 can be programmed to generate identity tokens in one of a plurality of formats including, without limitation, X509, Kerberos, SAML (1.0 and 2.0), Simple eXtensible Identity Protocol ("SXIP"), etc.

For example, in one embodiment, claims authority 140 is programmed to generate claims in a first format A, and the security policy of relying party 120 requires an identity token in a second format B. Claims transformer 130 can transform the claims from claims authority 140 from format A into format B before sending an identity token to principal 110. In addition, claims transformer 130 can be programmed to refine the semantics of a particular claim. In example embodiments, the semantics of a particular claim are transformed to minimize the amount of information provided in a particular claim and/or identity token to reduce or minimize the amount of personal information that is conveyed by a given claim.

In example embodiments, claims transformer 130 forwards the identity token 150 to principal 110 using the response mechanisms described in WS-Trust. In one embodiment, claims transformer 130 includes a security token service (sometimes referred to as an "STS"). In an example embodiment, principal 110 forwards identity token 150 to relying party 120 by binding identity token 150 to an to application message using the security binding mechanisms described in WS-Security. In other embodiments, identity token 150 may be sent directly from the identity provider 115 to relying party 120.

Once relying party 120 receives identity token 150, relying party 120 can verify (e.g., by decoding or decrypting the identity token 150) the origin of signed identity token 150. Relying party 120 can also utilize the claim(s) in identity token 150 to satisfy the security policy of relying party 120 to authenticate principal 110.

Provisioning of DIRs will now be discussed in greater detail. Principal 110 may obtain a DIR in a variety of ways. In the example embodiment illustrated in FIG. 1, DIR generation system 164 is generally used to communicate with principal 110, create new DIRs, and notify principal 110 of available DIRs. DIR generation system 164 may in some embodiments comprise an internet web site. In other embodiments, DIR generation system 164 may comprise a web service. DIR generation system 164 may also include or work in conjunction with an internet information server (IIS) 166 in certain embodiments.

Identity data store 168 is a digital information storage system that can be accessed in certain embodiments by identity provider 115, DIR generation system 164, and administrator system 160. Identity data store 168 may comprise a database server, computer memory, or any other data storage device(s). Identity data store 168 may be comprised of a plurality of devices or systems in a distributed data model. Identity data store 168 may also include or comprise a directory service such as Active Directory 169 propagated by Microsoft Corporation of Redmond, Wash.

Administrator system 160 may include a computer system, including a user interface that will allow an administrator to communicate with identity data store 168 and DIR generation system 164. Administrator system 160 permits an administrator to organize and administer the data within identity data store 168. It also permits an administrator to determine the types of DIRs that DIR generation system 164 creates, and allows an administrator to control whether a particular principal is eligible to receive particular DIRs. Use of administrator system 160 is discussed further below.

Certain embodiments may include a separate data capture system 162. Data capture system 162 may comprise a computer system adapted to capture information relating to principals. For example, data capture system 162 may comprise a human-resources computer system that captures personal information about a principal, such as name, phone number, social security number, address, etc. Data capture system 162 may include separate storage or may utilize the identity data store 168.

Figure 2:
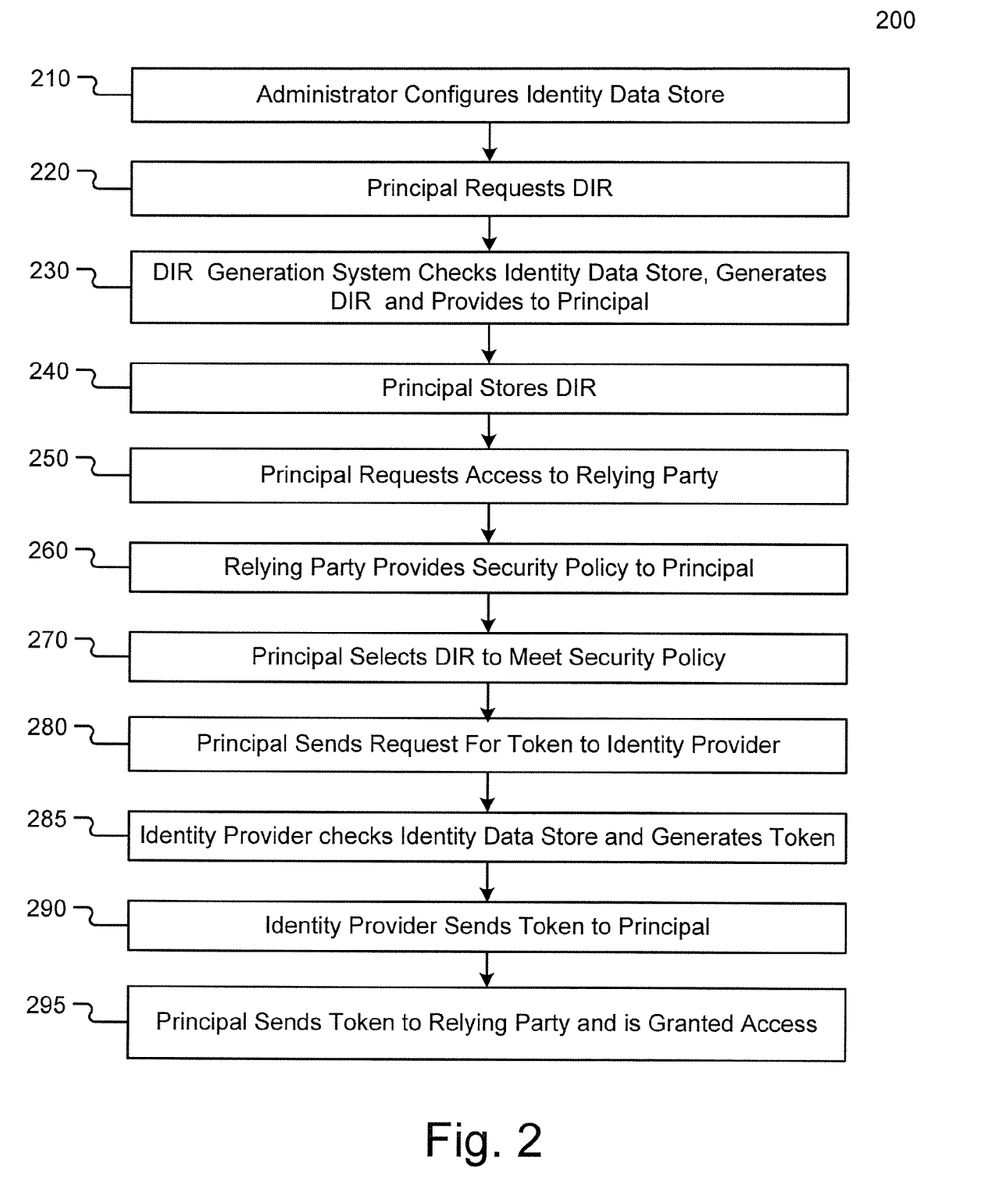
FIG. 2 illustrates an example method for DIR provisioning and use.

FIG. 2 illustrates a method 200 that may be implemented via system 100. At step 210, an administrator configures an identity data store. For example, an administrator may use administrator system 160 to configure identity data store 168. The administrator may, in some embodiments, use administrator system 160 to set up tables in identity data store 168 that will be used to administer, generate, and manage DIRs. In an exemplary embodiment, the administrator may determine the types of claims that will be supported in DIRs created by DIR generation system 164 and identity tokens generated by identity provider 115. The administrator may also use administrator system 160 to configure identity data store 168 to store policy information, such as the types of tokens identity provider 115 supports, entitlement information, and federation metadata. Other information in identity data store 168 that may be embedded in a DIR include a photograph of the principal 110 and connectivity information relating to identity providers such as identity provider 115.

The method 200 then proceeds to step 220, when principal 110 requests a DIR. A request for a DIR can be made in a variety of ways. For example, principal 110 can use principal machine 111 to access DIR generation system 164. In some embodiments, DIR generation system 164 is a web site, and principal machine 111 accesses the DIR generation system 164 through an Internet browser to request a DIR. In some embodiments, principal 110 requests a particular DIR. In other embodiments, discussed further below, principal 110 requests a list of DIRs available to principal 110 and chooses from that list.

The method 200 then proceeds to step 230, when DIR generation system 164 checks with the identity data store 168, generates the DIR, and provides the DIR to principal 1 10. In one embodiment, DIR generation system 164 first checks with identity data store 168 to determine whether the principal 110 is entitled to the requested DIR. This can be accomplished in a variety of ways, including by checking an entitlements DLL within identity data store 168, performing an Active Directory access check, etc. DIR generation system 164 may also access identity system metadata stored within identity data store 168 to determine what types of identity claims are available to be included within the new DIR.

When DIR generation system 164 creates the new DIR, the DIR may take the form of an XML document and may include, among other information: an image for display on the principal machine; a list of claims included in the DIR; a list of available token types for the DIR; a unique DIR identifier; a credential hint (discussed further below); identification of the identity provider; and an end-point reference for the identity provider 115. The new DIR may be provided to the principal in a variety of ways as well, including an email of the new DIR, an HTTP message, or other methods. As used herein, "email" includes text messaging, instant messaging, and similar forms of electronic communication.

Upon receipt of the new DIR, the principal 110 stores 240 the DIR, for example in memory associated with principal machine 111. Principal 250 then requests access to a relying party, such as relying party 120. The relying party denies access (e.g., via a redirect to an authentication page) and provides 260 its security policy back to the principal 110. The principal 110 then selects 270 a DIR to meet the security policy of the relying party 120. This can be accomplished, for example, through a user interface on the principal machine 111 that displays all available DIRs to principal 110. In some embodiments, DIRs that meet the requirements of the relying party's security policy may be highlighted for the principal 110, and other cards may be dimmed to make the selection process easier for the principal 110.

Principal 110 then sends 280 the request for an identity token to an identity provider, such as identity provider 115. This request for an identity token can be generated automatically by principal machine 111 upon selection by principal 110 of a DIR stored on principal machine 111. Identity provider 115 checks 285 the identity data store 168 to obtain the required information to populate the requested identity token. This information could include, for example, claims data. For example, if the selected DIR includes a claim of age, the identity provider 115 may check the identity data store 168 to determine the age of principal 110. Identity provider 115 is then able to create 285 the requested identity token and send 290 it to the principal. The principal then sends 295 the identity token to the relying party and is granted access as previously discussed.

In providing access by identity provider 115 to the same identity data store 168 used by DIR generation system 164, an administrator can ensure that the generation of DIRs remains in synch with the actual data available to fulfill claims in a requested identity token. For example, if an administrator configures identity data store 168 such that data for an age claim is not stored there, then DIR generation system 164 will not create a DIR that includes an option for an age claim. Otherwise, synchronization problems can arise. For example, assume an administrator creates a new DIR ad hoc (without reference to available identity data), and an age claim is included and sent as part of a DIR back to a principal. When the principal attempts to obtain an identity token with an age claim, that information is not available, and the token will be rejected by the relying party as insufficient. System 100, by contrast, permits automatic synchronization of the DIRs generated and the availability of underlying data to populate corresponding identity tokens. An administrator is provided the ability through administrator system 160 to make changes in the identity data store that will automatically affect both provisioning of DIRs and issuance of corresponding identity tokens.

In some embodiments, when the administrator makes particular changes to identity data store 168 that affect the validity of already-issued DIRs, any principals who have received affected DIRs are notified and permitted to obtain new DIRs. For example, assume privacy regulations require that the administrator eliminate the home addresses of any principals stored in identity data store 168. Any principal 110 that received a DIR that included a claim as to his/her home address now has an invalid DIR (because there is no longer any data in identity data store 168 to satisfy that claim). In one embodiment, all such principals are notified, for example via an email from DIR generation system 164, that the DIR(s) are now invalid and inviting the principals to obtain a new DIR that does not include the no-longer-supported home address claim. In this manner, the single change by the administrator to the identity data store 168 (a) prevents new DIRs from being issued with a home address claim, and (b) alerts principals that existing DIRs that include that claim are invalid and may be replaced.

Figure 3:
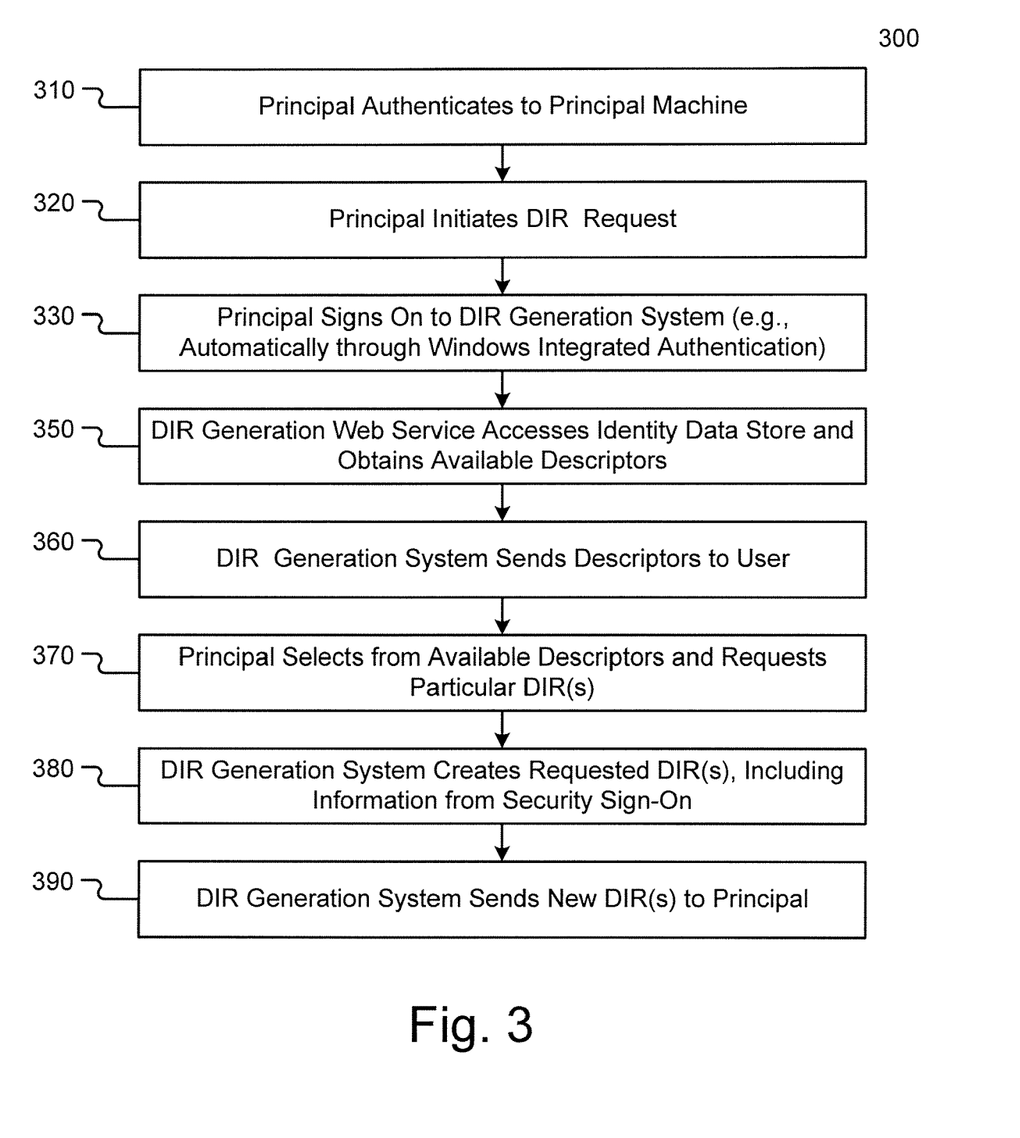
FIG. 3 illustrates another example method for DIR provisioning and use.

Referring now to FIG. 3, an exemplary method 300 is described in relation to the system 100 shown in FIG. 1. In this example, the principal 110 authenticates to the principal machine 111. Principal machine 111, for example, may be connected to an intranet that includes a directory service, such as Active Directory server 169. Authentication of principal 110 to principal machine 111 may include using sign-on information from any known method, including username/password, smart card, etc. Principal 110 then initiates 320 a DIR request by, for example, pointing a browser on the principal machine 111 to a web site that comprises the DIR generation system 164. Principal 110 then authenticates 330 at the DIR generation system 164. In some embodiments, principal machine 111, DIR generation system 164, identity data store 168, identity provider 115, and administrator system 160 could be part of the same intranet. In that embodiment, it is possible that single-sign-on capability may be available. For example, if the principal machine is running a WINDOWS operating system available from Microsoft Corporation of Redmond, Wash., and Windows Integrated Authentication is turned on, then authentication at the DIR generation system 164 may be automatic and seamless to the principal 110—information used to log on to principal machine 111 is passed to DIR generation system 164 along with the request for access. In other embodiments, the administrator may configure DIR generation system 164 to require a separate authentication of principal 110. The administrator may configure the DIR generation system 164 to require any of a variety of authentication mechanisms, including username/password, smart card, etc. In some embodiments, the principal 110 may be authenticated by IIS 166, which can be easily configured by an administrator to accept any of a variety of authentication methods.

Once the principal 110 is authenticated, DIR generation system 164 accesses 350 identity data store 168. In this example, the DIR generation system 164 takes the form of a web service to allow negotiation between the DIR generation system and the principal 110. In this example, the negotiation determines the type of DIR that will be returned to the principal 110. In this instance, the DIR generation system 164 obtains 350 available DIR descriptors. In exemplary embodiments, an administrator uses administrator system 160 to create DIR descriptors. For example, a corporate IT administrator may create descriptors that represent different DIRs for different levels of employees. A part-time employee, for example, may have a different set of claims than a full-time employee. A CEO may have a different set of claims than a staff employee. Even the images that are associated with each DIR descriptor may vary—e.g., the sales group DIR image could be orange while the accounting group DIR image is green. Further, it is possible to personalize the card image to contain the image of the principal 110 (obtained from the identity data store 168). This enhances the association that the principal 110 makes between his/her DIRs and the identity provider 115. It provides better "fingerprinting" capabilities as well.

In some embodiments, the administrator system 160 includes a user interface that parses through all of the available types of information available in the identity data store 168 and presents the administrator with an easy way to create descriptors. For example, the administrator may be presented with a list of: (a) principal classes (e.g., part-time employee, full-time employee, executive team member, sales group member, etc.); (b) claim types (name, address, phone number, age, etc.); (c) security clearances; (d) employment status (current, terminated); etc. The administrator could then decide to create distinct descriptors available to some or all of the classes of principals. For example, all principals may be eligible to receive a basic DIR that includes the principal's name, phone number, and employment status. However, only the executive team may be eligible to receive a DIR that also includes a high-level security clearance. These descriptors can be created by the administrator and saved in the identity data store along with a policy delineating which principals are permitted to receive DIRs corresponding to particular descriptors. Possible commands that may be useful to an administrator in managing descriptors include: "GET DESCRIPTORS, GET ALL DESCRIPTORS, ADD DESCRIPTORS, CHANGE DESCRIPTORS, DELETE DESCRIPTORS, COPY DESCRIPTOR, etc."

The request by the principal 110 for available descriptors may be accomplished by the principal machine 111 through a web service method such as "GET DESCRIPTORS." This would cause the DIR generation system to check the principal 110 against the policy set by the administrator to determine which, if any, descriptors are available to that principal 110. This can be accomplished, e.g., via an Active-Directory access check. Descriptors may be stored in any or all of, e.g.: an identity data store 168, memory associated with DIR generation system 164, or a separate store.

The DIR generation system 164 then sends 360 the available descriptors to the principal machine 111. Principal 110 then selects 370 from the available descriptors and requests particular DIR(s) corresponding to the descriptor(s). Again, this can be accomplished, for example, by a web service method such as "GET CARD(s)" (referring in this example to Information Cards available in the Windows CardSpace system propagated at least in part by the Microsoft Corporation of Redmond, Wash.). A principal 110 may request one or several available DIRs.

The DIR generation system 164 then creates 380 the requested DIR(s). In exemplary embodiments, the DIR generation system includes in the DIR a credential hint to "back" the DIR. For example, the DIR may include a username/password credential hint, and the principal 110 may be required to authenticate using that username/password in order to use the DIR to obtain an identity token. In some embodiments, the authentication type can be taken from the authentication used by principal 110 to gain access to the DIR generation system 164. For example, if the principal 110 used a username/password combination to authenticate to IIS 166, the DIR generation system 164 may use the same username and password to back the DIR when it is sent back to the principal 110.

In other embodiments, the digital generation system may have access to a directory service, such as Active Directory 169, that may include other available authentication methods for a particular principal 110. For example, if principal 110 uses a username/password to authenticate to DIR generation system 164, but Active Directory also includes a certificate associated with a smart card registered to the principal 110, the DIR generation system 164 could include either or both authentication types as part of the DIR returned to the principal 110. In addition, if single-sign-on capability is enabled between the principal machine 111 and the DIR generation system 164, the authentication type that is included in the DIR may be the authentication type used by the principal 110 to authenticate to the principal machine 111.

Once the DIR(s) is/are generated by the DIR generation system 164, they are sent 390 to the principal 110 via any of a variety of methods, including email, HTTP, etc. In some embodiments, the file that includes the DIR(s) may be pin protected. This is because, particularly in the case where multiple DIRs are sent to the principal 110, the file containing the DIRs may include cryptographic key material that should be protected against unauthorized access. The pin allows the establishment of a shared secret between principal machine 111 and DIR generation system 164. A file containing DIR(s) then could be decrypted by the principal when installing the DIRs onto principal machine 111. Exemplary methods for initiating, approving, and sending DIRs are discussed further below.

Figure 4:
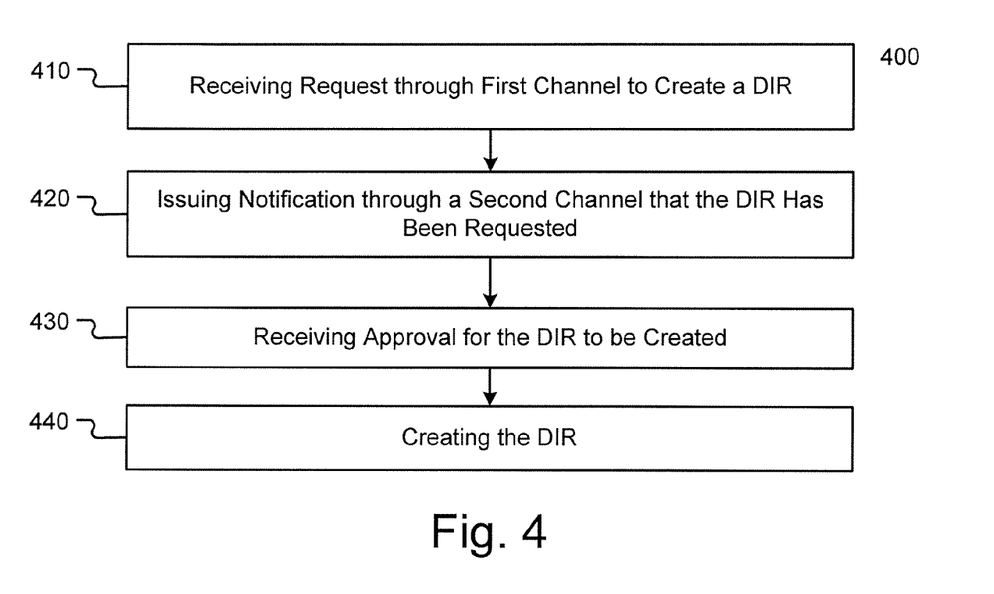
FIG. 4 illustrates another example method for DIR provisioning.

Referring now to FIG. 4, a method 400 is illustrated. At step 410 a request to create a DIR is received through a first channel. For example, principal 110 may use an internet browser on principal machine 111 to request a new DIR from DIR generation system 164. At step 420, a notification is issued 420 through a second channel that the DIR has been requested. For example, in response to a request for a new DIR from principal 110, the DIR generation system 164 or an application running on principal machine 111 may send an email notification that the request has been made. This may act as a "check" to ensure that the principal 110 is the one who is requesting the DIR and not an imposter. In some embodiments, the email may be directed to a known email address for the principal. In other embodiments, the notification may be directed to a third-party whom the administrator's policy requires to approve the issuance of a new DIR for the particular principal 110. For example, some DIRs may be available to certain employees in an organization only if their managers approve the issuance. This type of DIR may be used, for example, to gain access to a confidential work group.

As used herein, a "channel" refers to the manner in which information at issue is communicated. The distinction between different channels in method 400 is a logical one. Two distinct channels could employ some or all of the same physical or electronic communication link or different paths altogether. For example, a notification at step 420 could be sent over the same communication link (e.g., the Internet) as the approval at step 430, but the channels may be logically different (e.g., one could be an email and the other could be an HTTP message).

At step 430, an approval for the DIR to be created is received. For example, the recipient of the notification in step 420 from the DIR generation system 364 may respond and approve the issuance of the requested DIR. This can be accomplished in a variety of ways. For example, the notification in step 420 could comprise an email with a link to an approval site hosted by the DIR generation system 364.

At step 440, the requested DIR is created. If approval were denied by the recipient of the notification at step 420, other events may occur. For example, the administrator may be notified that an unauthorized request was made for a DIR.

Figure 5:
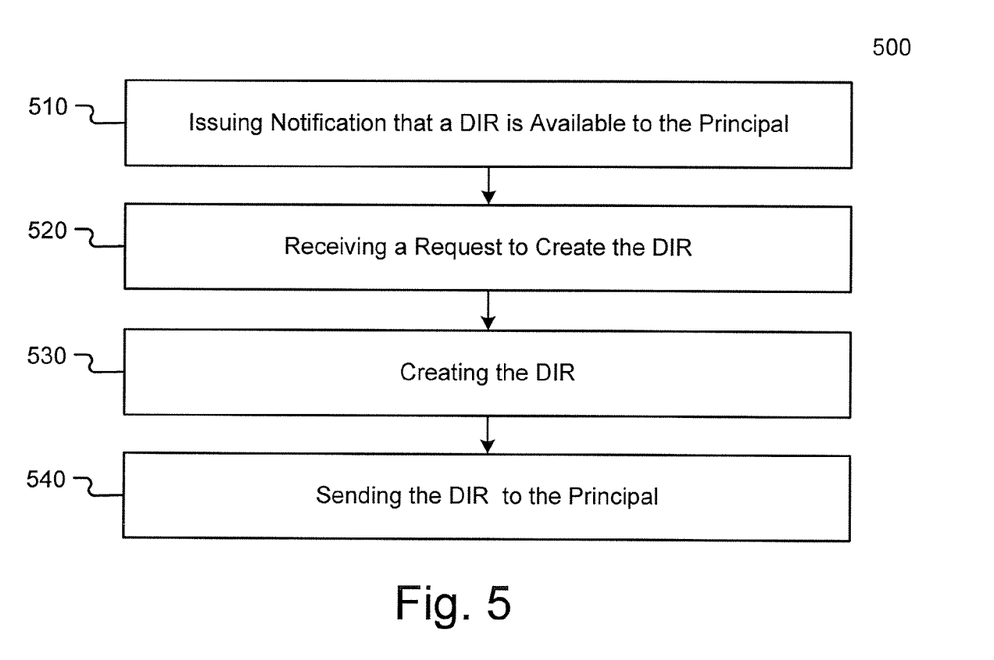
FIG. 5 illustrates another example method for DIR provisioning.

Referring now to FIG. 5, another exemplary method 500 is shown. At step 510, a notification is issued that a DIR is available to a principal. For example, DIR generation system 364 could send principal 110 an email alerting the principal 110 that a new DIR is available. Alternatively, the notification could go to a third party, such as the principal's manager. This type of notification could be useful in a situation where the administrator has, for example, changed the identity data store 168 to include an additional descriptor. DIR generation system 364 could then be used to notify all principals in a class that qualifies for the descriptor that the new DIR is available. For instance, a manager in a particular business unit may ask an administrator to create a new descriptor for a DIR to be used in conjunction with a particular project. Once the administrator creates the descriptor, the notification of all the principals the manager desires to have the new DIR could be automatic.

Notification 510 could also be included as part of a general business workflow. For example, when a new principal starts work an organization, the human resources department could capture information about the principal through data capture system 162. That data capture could kick off a series of automated steps, including storing the relevant identity data regarding the principal in the identity data store 168 and notifying the principal 110 that a DIR is now available to him/her. Notification can take many forms, including an email to the principal that includes a link to a web site that comprises the DIR generation system 164. Alternatively, an application could be running on the principal machine 111 that is adapted to receive a message from the DIR generation system 164 that a new DIR is available to the principal 110 (e.g., the application could spawn a pop-up message, an icon could appear in a toolbar on the principal machine 111, etc.).

At step 520, a request to create the DIR is received. This step can be accomplished again in a variety of manners. For example, the principal 110 could respond to a notification email by clicking on a link that takes him/her to a web page that gives the principal the option to request the DIR. Alternatively, where an application on the principal machine 111 alerts the principal 110 that the DIR is available, the principal could request the DIR within such application and the application could send a message back to the DIR generation system 364 to make the request.

At step 530, the DIR is created as requested. The creation of the DIR may be accomplished as described elsewhere herein. The DIR is then sent 540 to the principal, also as described elsewhere herein.

Figure 6:
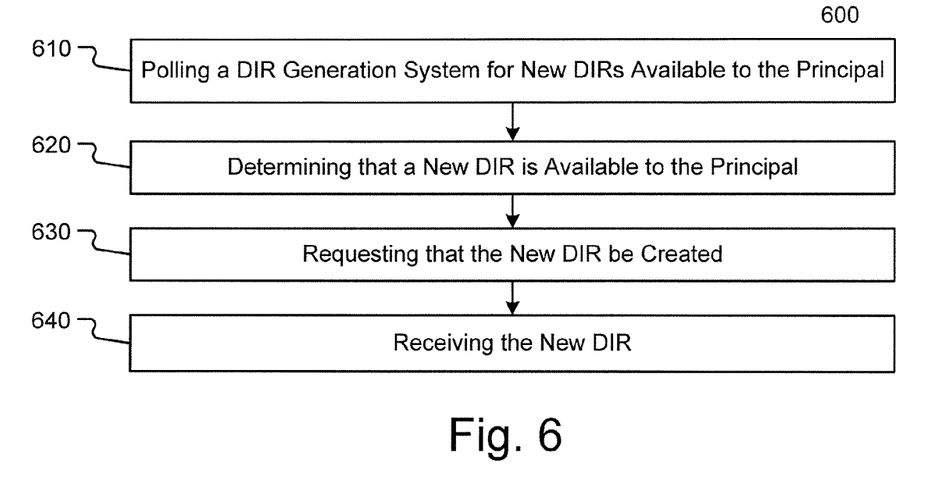
FIG. 6 illustrates another example method for DIR provisioning.

Referring now to FIG. 6, another exemplary method 600 is shown. At step 610, a DIR generation system is polled for new DIRs that are available to the principal. For example, principal machine 111 may be programmed to periodically poll the DIR generation system 164 at predetermined intervals. At step 620, it is determined whether any new DIRs are available to the principal. The DIR generation system 164, for example, could check in identity data store 168 whether any new descriptors have become available to principal 110 since the time it was last polled by principal machine 111. At step 630, a request is made that the new DIR be created. Continuing the example, upon receipt of notification that a new DIR is available, the principal 110 could request that the DIR generation system 164 create the new DIR. At step 640, the new DIR is received (e.g., a new DIR could be received by the principal machine 111 from the DIR generation system 164). This method 600 is another example of how an administrator's job could be simplified. If all principal machines were programmed to poll for new DIRs, for example, when an administrator creates a new DIR descriptor in identity data store 168, the issuance and delivery of the new DIRs is automatic and requires no further work on behalf of the administrator.

Figure 7:
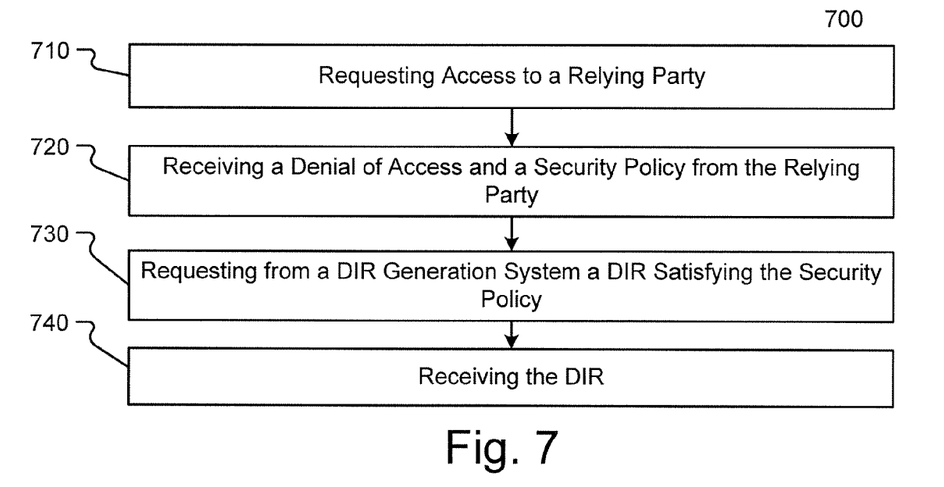
FIG. 7 illustrates another example method for DIR provisioning.

It may also be beneficial to be able to create DIRs dynamically in response to a relying party's security policy. Referring now to FIG. 7, an example method 700 is illustrated. At step 710, access is requested to a relying party. For example, if relying party 120 is a restricted web site, principal machine 111 attempts to access the web site through a browser. At step 720, access to the relying party is denied and a security policy from the relying party is received. Continuing the example, the relying party 120 sends principal machine 111 its security policy and an HTTP message that redirects the principal machine 111 browser to an authentication web page. A DIR that satisfies the security policy is then requested 730 from a DIR generation system. In the example above, the principal machine 111 may first check whether it has a sufficient DIR and, if not, principal machine 111 may be programmed to query a local cache for identity providers that offer DIRs meeting the security policy of relying party 120. Principal machine may also query a public list of DIR providers hosted by a third party. Principal 110 can then choose an appropriate DIR provider and DIR generation system, such as DIR generation system 164. At step 740, the DIR is received. In the example above, the principal machine 111 receives the new DIR, which it can then forward to identity provider 115 to obtain the necessary identity token to gain access to relying party 120.

In some embodiments, the principal machine 111 may forward the security policy of relying party 120 to the DIR generation system 164. The DIR generation system 164 may then check the identity data store 168 to determine whether the claims and other requirements set forth in the security policy can be satisfied. If so, a DIR meeting the security policy would be created. In this manner, a principal is able to obtain a DIR on an as-needed basis, regardless of whether the administrator has preconfigured an identity descriptor that meets the needs of that particular relying party's security policy.

Figure 8:
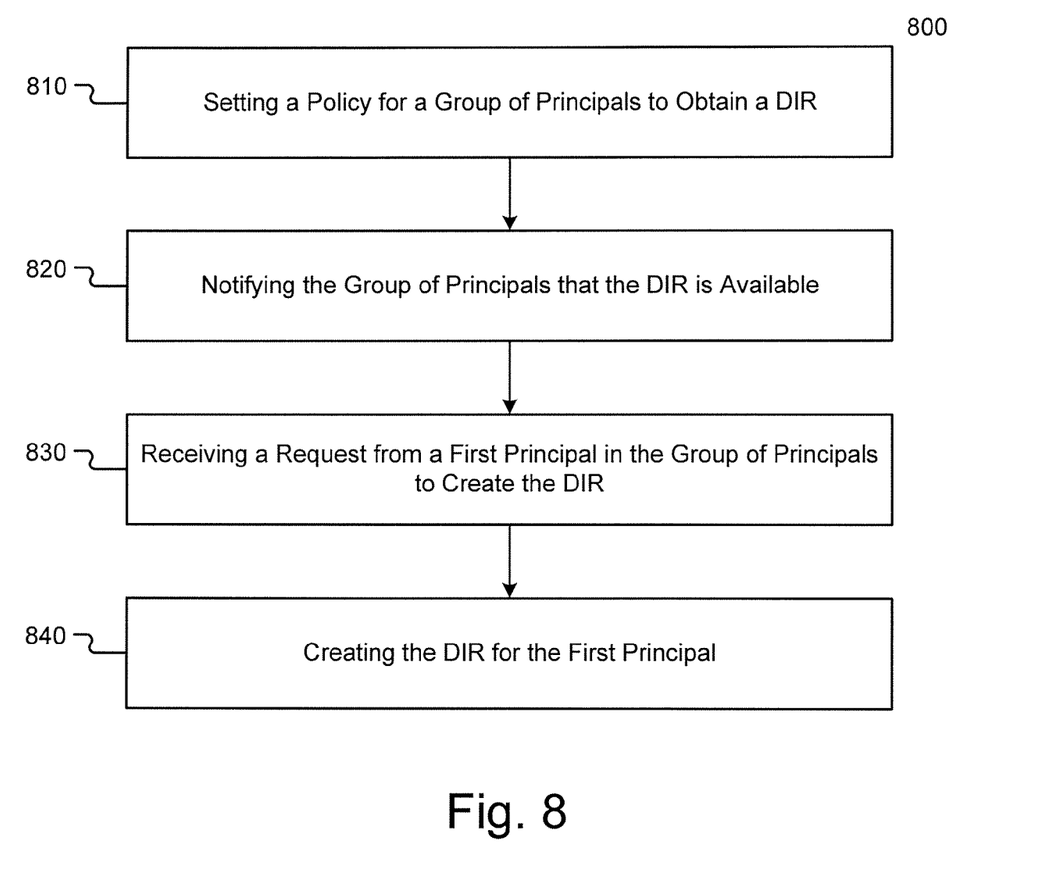
FIG. 8 illustrates another example method for DIR provisioning.

Referring now to FIG. 8, another exemplary method 800 is shown. At step 810 a policy is set for a group of principals, authorizing the group of principals that a DIR is available. With reference to the exemplary system 100 of FIG. 1, an administrator could use administrator system to set a policy in identity data store 168 authorizing all principals that are part of a particular group to receive a particular DIR. In some embodiments, this can be accomplished by an administrator using the "Group Policy" feature available in Active Directory 169 or other means to launch a client-side application resident on principal machine 111. At step 820, the group of principals to whom the DIR is available is notified. In the example above, the client-side application resident on principal machine 111 is activated. This can result in the principal 110 being prompted that a DIR is now available (e.g., through a pop-up, a tool-bar icon, etc.). The client-side application can have its own set of rules (e.g., ability for the principal 110 to choose to be reminded later, to provide the principal 110 only a certain amount of time to retrieve the new DIR, etc.). At step 830, a request from at least a first principal in the group of principals is received to create the DIR. In some embodiments this may involve the user authorizing the creation of the DIR through the client-side application resident on principal machine 111. In other embodiments, the client-side application may request the DIR without further involvement of the principal 110. At step 840, the DIR is created for the first principal.

Figure 9:
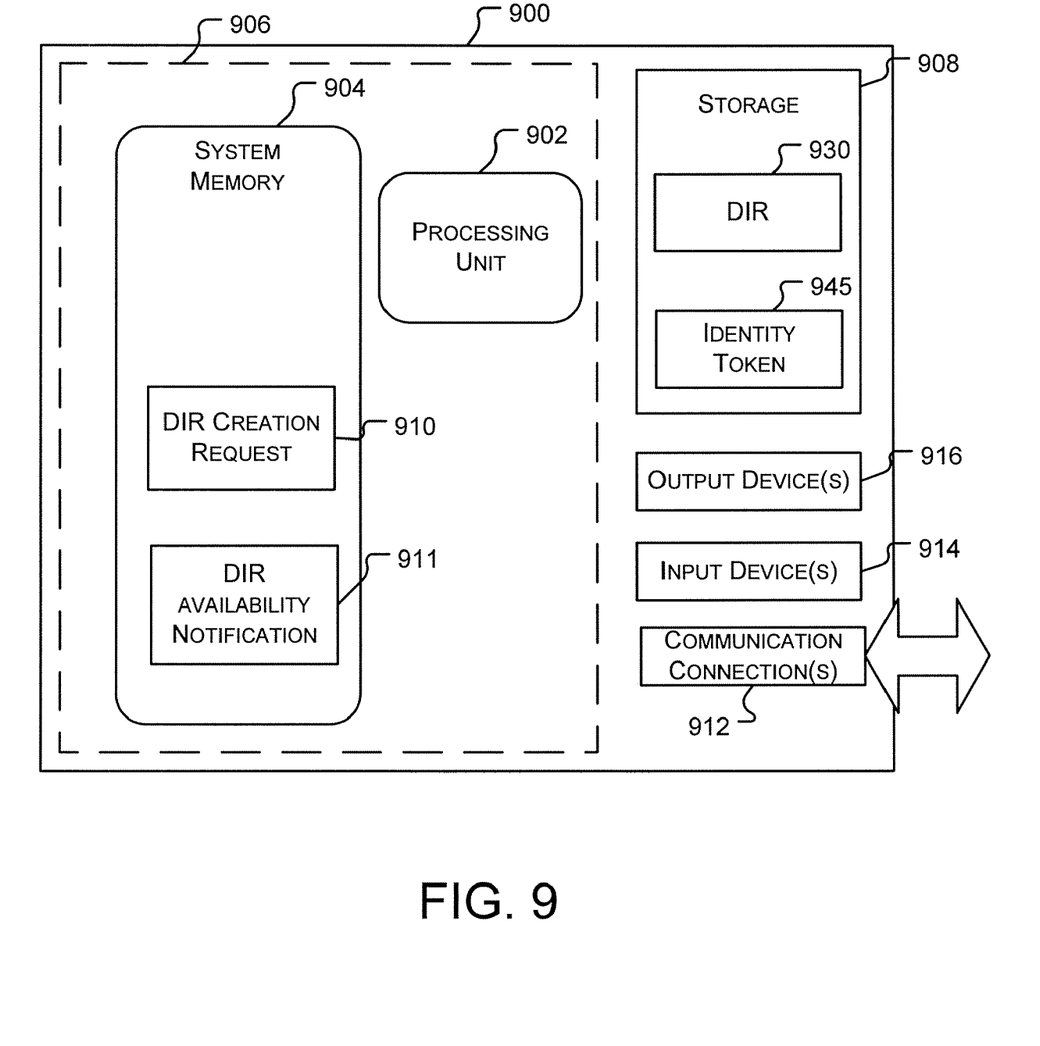
FIG. 9 illustrates an example of a computing device.

FIG. 9 illustrates a general computing device 900 (also referred to herein as a computer or computer system), which can be used to implement the embodiments described herein. The computing device 900 is only one example of a computing environment and is not intended to suggest any limitation as to the scope of use or functionality of the computer and network architectures. Neither should the computing device 900 be interpreted as having any dependency or requirement relating to any one or combination of components illustrated in the example computing device 900. In embodiments, computing device 900 may be used, for example, as a principal machine 111, DIR generation system 164, data capture system 162, IIS 166, identity data store 168, active directory 169, administrator system 160, identity provider 115, or relying party 120 as described above with respect to FIG. 1.

In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. System memory 904 stores applications that are executing on computing device 900. In addition to applications, memory 904 may also store information being used in operations being performed by computing device 900, such as a DIR creation request 910 and/or a DIR availability notification 911, as described below with respect to FIGS. 1-8.

Additionally, computing device 900 may also have additional features/functionality. For example, computing device 900 may also include additional storage 908 (removable and/or non-removable) including, but not limited to, magnetic or optical disks or tape. Such additional storage is illustrated in FIG. 9 by storage 908. Computer storage media includes volatile and nonvolatile, removable and non-removable media implemented in any method or technology for storage of information such as computer readable instructions, data structures, program modules or other data. Memory 904 and storage 908 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 900. Any such computer storage media may be part of computing device 900.

As those with skill in the art will appreciate, storage 908 may store a variety of information. Among other types of information, storage 908 may store a digital identity representation 930 (e.g., in the case of a principal machine) or an identity token 945 (e.g., in the case of an identity provider).

Computing device 900 may also contain communications connection(s) 912 that allow the system to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 900 may also have input device(s) 914 such as keyboard, mouse, pen, voice input device, touch input device, etc. Output device(s) 916 such as a display, speakers, printer, etc. may also be included. All these devices are well know in the art and need not be discussed at length here.

The various embodiments described above are provided by way of illustration only and should not be construed to limiting. Those skilled in the art will readily recognize various modifications and changes that may be made to the embodiments described above without departing from the true spirit and scope of the disclosure or the following claims.

We claim:

1. A method for provisioning a digital identity representation for a principal, comprising the steps of:
    receiving input defining a descriptor for the digital identity representation;
    storing the descriptor;
    receiving a request for the descriptor from the principal;
    sending the descriptor to the principal;
    receiving a selection of the descriptor;
    in response to receiving a selection of the descriptor, receiving a request through a first channel to create the digital identity representation corresponding to the selected descriptor for the principal;

issuing a second notification through a second channel that the digital identity representation has been requested;

receiving approval for the digital identity representation to be created; and creating the digital identity representation.

2. The method of claim 1, wherein the second notification is an electronic message sent to a known address for the principal.

3. The method of claim 1, wherein the second notification is an electronic message sent to a third party that is different from the principal.

4. The method of claim 1, wherein the second notification includes an electronic link to facilitate the approval.

5. The method of claim 1, wherein the first channel is an HTTP request and the second channel is an email.

6. The method of claim 1, further comprising the steps of:

receiving a second request through the first channel to create a second digital identity representation for the principal;

issuing a third notification through the second channel that the second digital identity representation has been requested;

receiving a denial of approval for the digital identity representation to be created;

sending an electronic message to a third party that the denial of approval has been received.

7. A method for provisioning a digital identity representation for a principal, comprising the steps of:

receiving input defining a descriptor for the digital identity representation;

storing the descriptor;

in response to storing the descriptor, automatically issuing a notification to the principal that the digital identity representation is available for the principal;

receiving a request to create the digital identity representation;

creating the digital identity representation, wherein the digital identity representation includes at least one authentication type requiring authentication to a digital identity representation generation system prior to accessing the digital identity representation; and sending the digital identity representation to the principal.

8. The method of claim 7, wherein the notification includes a link to an electronic site to enable creation of the request.

9. The method of claim 7, further comprising the step of:
capturing data regarding the principal;
wherein the step of issuing is automatically performed following the step of capturing.

10. The method of claim 7, wherein the notification is issued to a third party.

11. The method of claim 7, wherein the principal is a member of a group of principals, further comprising the step of:

setting a policy that the group of principals is permitted access to the digital identity representation;

wherein the step of issuing the notification comprises issuing the notification to the group of principals.

12. The method of claim 11, wherein the step of issuing the notification comprises sending a message to at least one application running on a principal machine that is associated with at least one of the principals in the group of principals.

13. The method of claim 12, wherein the request is created by the at least one application automatically, without prompting by the at least one principal.

14. The method of claim 7, further comprising the steps of:
cryptographically protecting a file containing the one or more digital identity representations; and sending the cryptographically protected file containing the one or more digital identity representations to a principal machine.

15. A system for provisioning a digital identity representation for a principal, the system comprising:

at least one processing unit;

memory, communicatively connected to the at least one processing unit and storing instructions that, when executed by the at least one processing unit, perform a method, the method comprising the steps of:

receiving input defining a descriptor for the digital identity representation;

storing the descriptor;

receiving a request for the descriptor from the principal;

sending the descriptor to the principal;

receiving a selection of the descriptor;

in response to receiving a selection of the descriptor, receiving a request to create the digital identity representation corresponding to the selected descriptor for the principal;

creating the digital identity representation;

polling a digital identity representation generation system to determine whether a second digital identity representation is available to the principal;

determining that a second digital identity representation is available to the principal by determining that a new descriptor is available to the principal;

in response to determining that a second digital identity representation is available, automatically sending to the principal a notification that the second digital identity representation is available to the principal;

receiving a request to create the second digital identity representation; and creating the second digital identity representation.

16. The method of claim 15, wherein the notification includes a link to an electronic site to enable creation of the request.

17. The method of claim 15, further comprising the step of:
capturing data regarding the principal;
wherein the step of issuing is automatically performed following the step of capturing.

18. The method of claim 15, wherein the principal is a member of a group of principals, further comprising the step of:

setting a policy that the group of principals are permitted access to the digital identity representation;

wherein the step of issuing the notification comprises issuing the notification to the group of principals.

19. The method of claim 18, wherein the step of issuing the notification comprises sending a message to at least one application running on a principal machine that is associated with at least one of the principals in the group of principals.

* * * * *